(12) United States Patent
Tarchinski

(10) Patent No.: US 7,768,237 B2
(45) Date of Patent: Aug. 3, 2010

(54) SIMPLIFIED AUTOMATIC DISCHARGE FUNCTION FOR VEHICLES

(75) Inventor: James E. Tarchinski, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 606 days.

(21) Appl. No.: 11/747,379

(22) Filed: May 11, 2007

(65) Prior Publication Data

US 2008/0278117 A1 Nov. 13, 2008

(51) Int. Cl.
*H02J 7/00* (2006.01)
*H02P 9/04* (2006.01)

(52) U.S. Cl. ............... 320/135; 320/167; 290/40 C
(58) Field of Classification Search ............ 320/103, 320/104, 135, 137, 166, 167; 318/139; 307/9.1, 307/10.1, 52, 71, 75; 902/903, 906, 907; 290/40 C
See application file for complete search history.

(56) References Cited

U.S. PATENT DOCUMENTS

| | | | | |
|---|---|---|---|---|
| 5,998,973 A * | 12/1999 | Tsai | ...................... | 320/135 |
| 6,624,613 B2 * | 9/2003 | Kitagawa | .................. | 320/124 |
| 7,459,886 B1 * | 12/2008 | Potanin et al. | ............ | 320/135 |
| 7,557,583 B2 * | 7/2009 | Zettel et al. | ................. | 324/418 |
| 2006/0071618 A1 * | 4/2006 | Yudahira et al. | ............. | 318/12 |
| 2007/0159007 A1 * | 7/2007 | King et al. | ................... | 307/71 |
| 2007/0221627 A1 * | 9/2007 | Yugou et al. | ............... | 218/136 |

* cited by examiner

*Primary Examiner*—Patrick J Assouad
*Assistant Examiner*—M'Baye Diao
(74) *Attorney, Agent, or Firm*—Ingrassia Fisher & Lorenz, P.C.

(57) ABSTRACT

Methods and system are disclosed for an automatic discharge function for a vehicle having an electric or hybrid electric motor. The methods and system monitor the motor for occurrence of a power shutdown. If the power shutdown occurs, a contactor pair is opened, and immediate discharging of capacitance is initiated in response to opening the contactors pair. Discharging is continued until the capacitance is completely discharged.

23 Claims, 3 Drawing Sheets

SIMPLIFIED AUTOMATIC DISCHARGE FUNCTION FOR VEHICLES

TECHNICAL FIELD

The present invention relates generally to vehicles, and more particularly relates to safety devices for automatically disconnecting electrical power from vehicles.

BACKGROUND OF THE INVENTION

Hybrid, fuel cell, and electric vehicles often use high voltage circuits to provide power to electric drive motors and for various other uses on the vehicle. High voltage electricity can potentially cause an electric shock hazard to any user or mechanic able to come in contact with it. One common method of reducing the risk of electric shock hazard is by using an automatic disconnect device.

An automatic disconnect device is generally implemented as a pair of high voltage relays with associated control circuits. It is placed electrically between the string of batteries in a battery pack and the traction components in the vehicle. The high voltage relays, which are also called contactors, can limit the electrical energy to one electrical side of the automatic disconnect device in response to various faults on the vehicle. Once opened, the high voltage electrical energy is confined to the battery pack.

High voltage components often use large capacitors to buffer their energy usage and provide quick bursts of energy. These capacitors are charged to full voltage during operation. Under some fault scenarios the capacitors are not discharged even after the high voltage relays are opened. Because of this, most vehicle manufactures install passive discharge resistors in their systems near the capacitors. Because passive discharge resistors take a significant amount of time to discharge the full capacitance, some manufactures also include an active or automatic discharge function with the automatic disconnect device.

The main difficulty with the traditional approach of implementing the automatic discharge function is that the control of the function is very complex. For example, the controlling transistor must not be turned on while the battery pack is still connected or the discharge resistor could be damaged by overloading. In some fault situations, such as during a loss of electrical power while controlling a permanent magnet motor, the transistor should generally be turned on automatically. Generally, a significant portion of this complex control is directed by software within the vehicle controllers. Because it is under software control it is somewhat more prone to incorrect activations, either not activating when it should or activating when it should not.

Accordingly, it is desirable to have a simple system for automatic discharge. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is disclosed for an automatic discharge function for a vehicle having an electric or hybrid motor. The method monitors the electric or hybrid electric motor for occurrence of a power shutdown. If the power shutdown occurs, contactors are opened, and discharging of capacitance is immediately initiated in response to opening the contactors. Discharging is continued until discharge of the capacitance is complete.

A system is disclosed for an automatic discharge function for a vehicle having a battery pack and a capacitance with contactors between the battery pack and the capacitance. The contactors are configured to open in order to disconnect automatically the battery pack and immediately start discharging the capacitance when a power shutdown occurs. A resistor is configured to discharge the capacitance. A power output stage configured to convert DC to AC may also be included to control how much power is sent to an electric or hybrid electric motor based on electric or hybrid electric motor modes such as acceleration of the electric or hybrid electric motor.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of vehicle applications and that the system described herein is merely one example embodiment of the invention.

For the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 2:
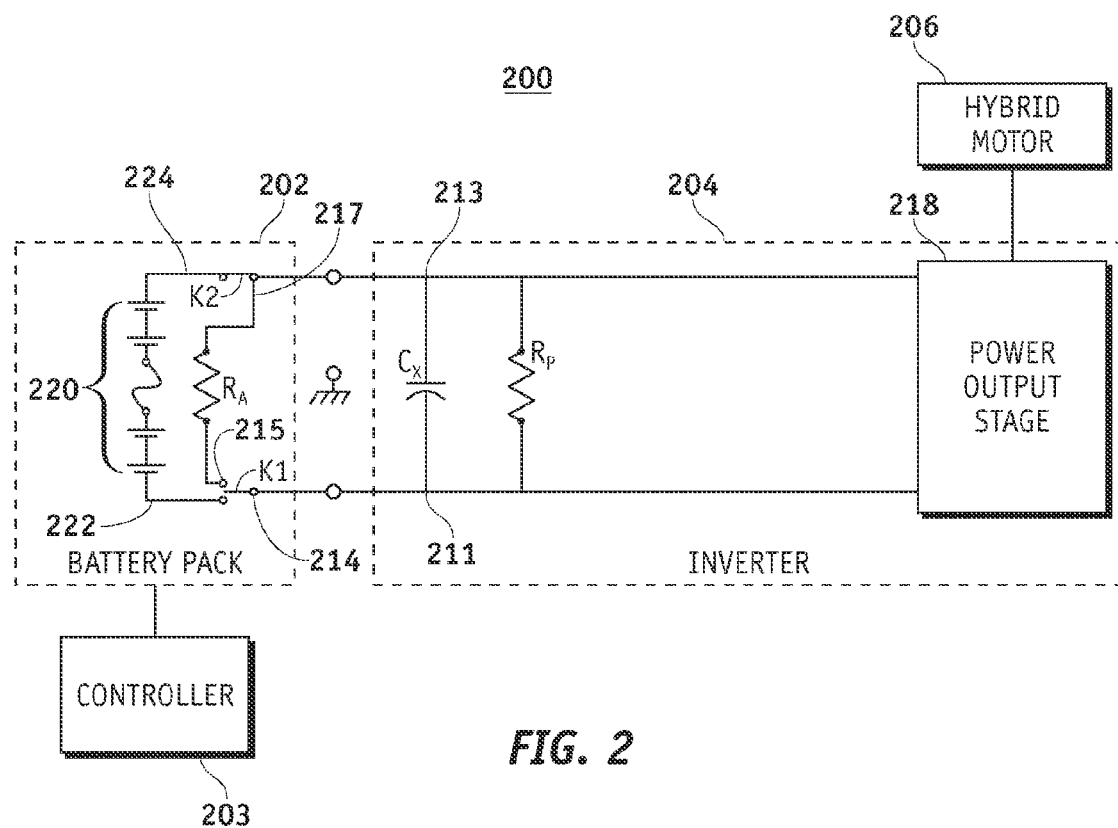
FIG. 2 is a schematic representation of an automatic discharge system for a hybrid vehicle according to an example embodiment of the invention.
Figure 3:
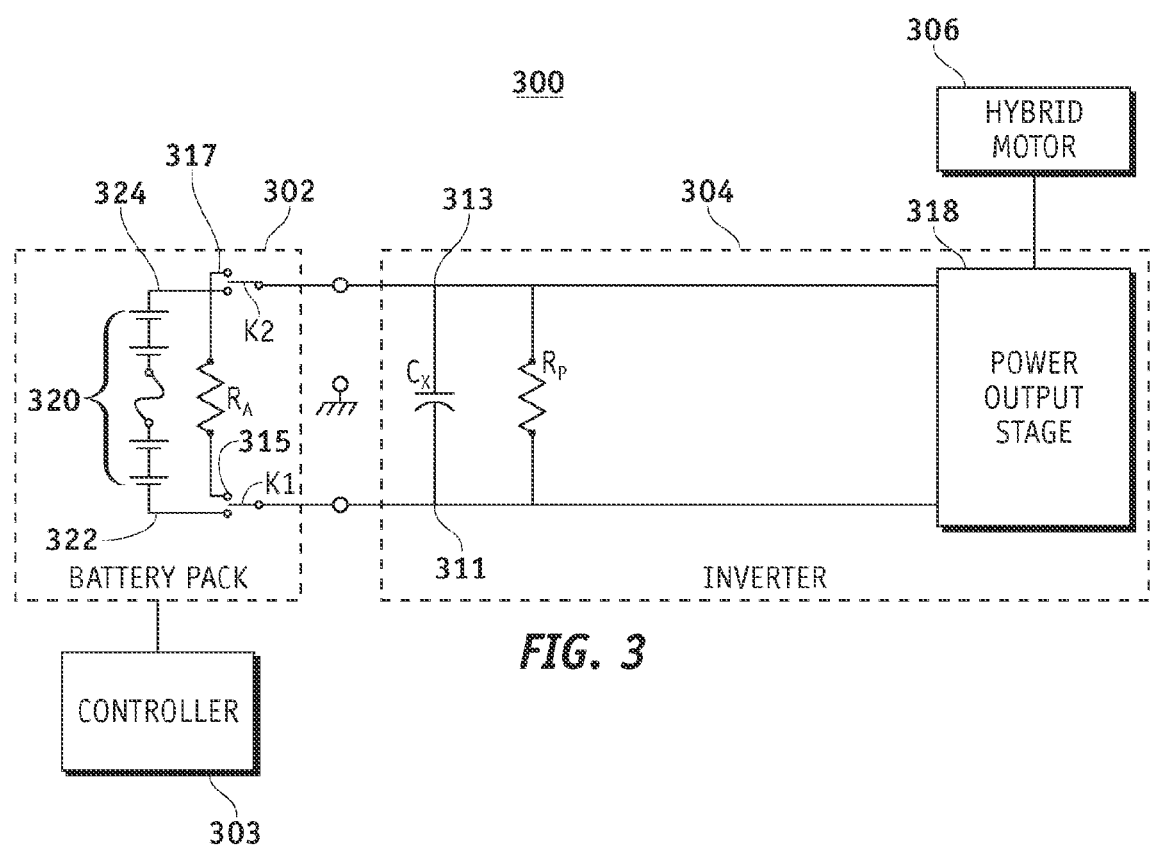
FIG. 3 is a schematic representation of an automatic discharge system for a hybrid vehicle according to an alternative example embodiment of the invention.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIG. 2 and FIG. 3 depict example arrangements of elements, additional intervening elements, devices, features, or components may be present in an embodiment of the invention (assuming that the functionality of the system is not adversely affected).

Embodiments of the invention are described herein in the context of one practical application, without limitation, namely a connection monitoring technique for a simplified automatic discharge function for hybrid vehicles. In this context, the example technique is applicable to detecting electrical circuit power shutdowns on the vehicle. Embodiments of the invention, however, are not limited to such vehicle applications, and the techniques described herein may also be utilized in other connection monitoring systems.

Figure 1:
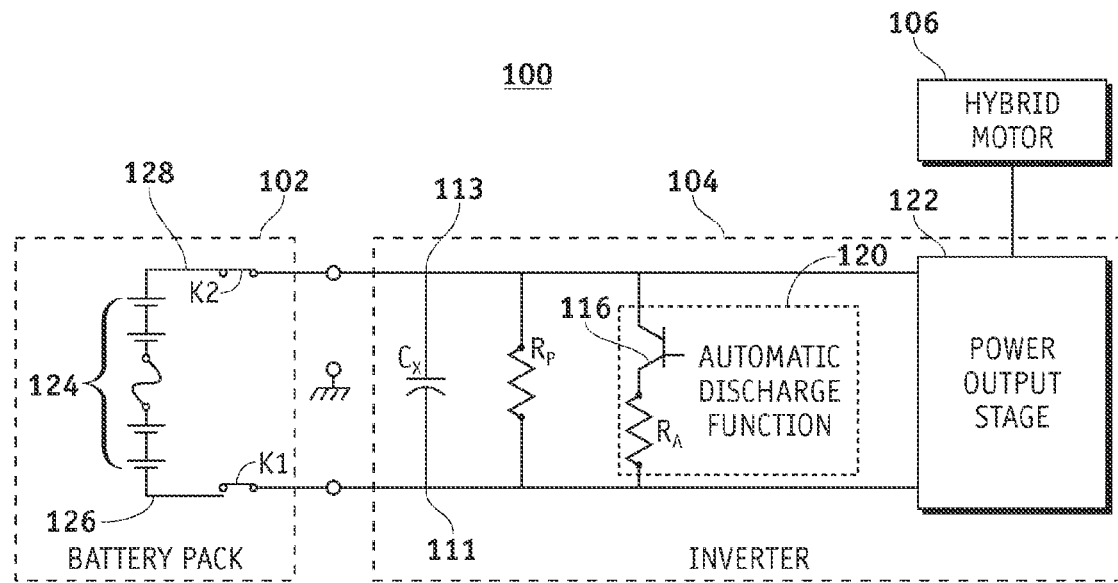
FIG. 1 is a schematic representation of an automatic discharge system including an existing automatic discharge function for a hybrid vehicle.

FIG. 1 is a schematic representation of an automatic discharge function system 100 for a hybrid vehicle. A system 100 may generally include: a battery pack 102, a DC-AC converter 104, and a hybrid motor 106.

The battery pack 102 is configured to support a hybrid vehicle operation. The battery pack 102 may be connected to the DC-AC converter 104 that provides power to the hybrid motor 106. The battery pack 102 may generally include: a battery series 124, a contactor K2, and a contactor K1.

The battery series 124 is configured to provide an electrical voltage and current to the hybrid motor 106 via a first battery pole 126, and a second battery pole 128. The electrical voltage provided by the battery series 124 is a high DC voltage, which may be in the neighborhood of 300 volts. Battery series 124 may be hybrid batteries such as, for example, without limitation, lead acid, nickel metal hydride, or lithium ion. The contactor K2 connects the battery pole 128 of the battery series 124 to the DC-AC converter 104, and contactor K1 connects the battery pole 126 of the battery series 124 to the DC-AC converter 104. Contactors K1 and K2 are configured to open in order to disconnect the battery series 124 when a power shutdown event occurs. A power shutdown event may correspond to an electric system or motor shutdown as part of normal vehicle operation, or various faults on the vehicle such as an electrical failure. Significant vehicle impact and the detection of attempted access to high voltage components are the two main items that would cause an open. Also, this circuit often opens the contactors after the user power's down the vehicle with the ignition switch, so that the high voltage is contained within the pack when the vehicle is off. Contactors K1 and K2 are single-pole single-throw switches.

DC-AC converter 104 provides power conditioning and control for the hybrid motor 106. The DC-AC converter generally includes: a capacitance $C_X$, a passive discharge resistor $R_p$, an automatic discharge function 120, and a power output stage 122.

A capacitance $C_X$ is included to buffer electrical energy between the battery pack 102 and the power output stage 122. A capacitance $C_X$ has a first pole 111 connected to contactor K1 and a second pole 113 connected to contactor K2. A capacitance may include, for example without limitation, an ultra-capacitor. For the purpose of illustration, the capacitance $C_X$ will also represent the capacitance that will naturally exist in other components of the hybrid vehicle coupled to but outside the battery pack such as, for example without limitation, an active electrical bus, power electronics, power output stage 122, or hybrid motor 106. Other common devices with significant capacitance are auxiliary power converters (DC-DC converters), electric air conditioning compressors, oil pumps, and power steering pumps. Each of these devices will contain the capacitors, power output stages, and the like.

A passive discharge resistor $R_p$ is included to provide a slow discharge of capacitance $C_X$. The passive discharge resistor $R_p$ is a large resistor on the order of 40 kilo Ohms. The passive discharge resistor $R_p$ operates at all times to give a discharge time on the order of about five minutes from operating voltage to less than 60 volts. This may be too slow to provide protection when a power shutdown event occurs.

An existing automatic discharge function 120 is included to provide a fast discharge of capacitance $C_X$ when a power shutdown event occurs. The automatic discharge function includes an active discharge resistor $R_A$, and an active discharge control switch 116. The active discharge resistor $R_A$ is configured to discharge the capacitance $C_X$. In this regard, the active discharge resistor $R_A$ is a small resistor on the order of about 25 ohms (30 watt capacity) that allows a high current to quickly discharge capacitance $C_X$ when active discharge control switch 116 allows current to flow. Active discharge control switch 116 (here shown as a bipolar power field effect transistor) is activated when a power shutdown event occurs.

The power output stage 122 performs the functions of converting the DC from the battery pack 102 to AC for the hybrid motor 106.

Hybrid motor 106 for this example includes an AC electric motor to provide additional power to an internal combustion engine, and for regenerative braking. AC electric motors are often used for this application because they provide high torque under load, and motor/generator operation.

FIG. 2 is a schematic representation of an automatic discharge system 200 that is suitably configured to perform an automatic discharge process according to an example embodiment of the invention. System 200 is suitable for use with a vehicle having an electric (or hybrid) traction motor. A practical automatic discharge system 200 may include a number of electrical components, circuits and controller units other than those shown in FIG. 2. Conventional subsystems, features, and aspects of the automatic discharge system 200 will not be described in detail herein. The automatic discharge system 200 has components that are similar to system 100 (common features, functions, and elements will not be redundantly described here). For this example embodiment, as shown in FIG. 2, the system 200 may generally include: a battery pack 202 or any suitable DC power supply, a controller 203, a DC-AC converter 204, and a hybrid motor 206.

The battery pack 202 may generally include: a battery series 220, a contactor K1, and a contactor K2, and an active discharge resistor $R_A$. The contactors together form a contactor arrangement, which is suitably configured to selectively couple the DC power supply in parallel with the capacitance of the vehicle while in an operating mode, or couple the active discharge resistor in parallel with the capacitance while in a shutdown mode. The contactor arrangement is actuated by a suitably configured controller 203, which can be coupled to the contactor arrangement.

The controller 203 may be implemented as part of a vehicle computing module, a centralized vehicle processor, a subsystem computing module devoted to the contactor arrangement, or the like. In operation, the controller 203 controls the actuation of the contactor arrangement in accordance with the current state of the vehicle, e.g., whether the shutdown mode or the normal operating mode is active. The controller 203 may react to vehicle data to determine whether the shutdown mode or the operating mode should be established. The controller 203 is generally a software-controlled device. Under normal conditions, it keeps both K1 and K2 closed during vehicle operation. If a significant fault is detected, either by controller 203 or by another controller in the system, controller 203 can be programmed to either open the contactors immediately or to shut down the hybrid motor 206 and then open the contactors.

Contactor K1, as influenced by the controller 203, is configured to couple the output stage input node 211 to a first end 215 of the active discharge resistor (while in the shutdown mode), and is configured to couple input node 211 to a first pole 222 of the DC power supply (while in the operating mode).

The battery series 220 is configured to provide an electrical voltage and current to the hybrid vehicle. Contactor K1 connects a first battery pole 222 of the battery series 220 to the DC-AC converter 204, and contactor K2 connects a second battery pole 224 of the battery series 220 to the DC-AC converter 204. In this embodiment, contactors K1 and K2 are configured to open simultaneously (within practical limitations known to those skilled in the art) in order to immediately disconnect the battery series 220 from the other components when a power shutdown occurs. For this example, contactor K2 is a single-pole single-throw switch and contactor K1 is a single-pole double-throw switch.

For this embodiment, the function to provide a fast discharge of capacitance $C_X$ whenever K1 is opened is done by active discharge resistor $R_A$. This capacitance may represent the vehicle capacitance associated with various electrical components, conductive elements, electrical circuitry, and the like. In this example, the capacitance is coupled across the two input nodes of the power output stage 218. Active discharge resistor $R_A$ is a small resistor that allows a high current to quickly discharge capacitance $C_X$ when a first end 215 of active discharge resistor $R_A$ is connected by contactor K1 to node 214 (such that contactor K1 is not connected to first battery pole 222 of battery series 220). In this regard, contactor K1 is disconnected from the battery series 220 and is then connected to active discharge resistor $R_A$ when K1 is opened. A second end 217 of active discharge resistor $R_A$ is continuously connected to one side of contactor K2 or any point electrically on a high voltage bus connected to node K2 on the DC-AC converter 204 side of K2.

DC-AC converter 204 provides power conditioning and control for the hybrid motor 206. The DC-AC converter generally includes: a capacitance $C_X$, a passive discharge resistor $R_p$, and a power output stage 218. However, for this embodiment, as compared to system 100, the automatic discharge function 120 and the active discharge control switch 116 are omitted.

The capacitance $C_X$ has a first pole 211 connected to contactor K1 and a second pole 213 connected to contactor K2 208.

A passive discharge resistor $R_p$ is included to provide a slow discharge of capacitance $C_X$. The passive discharge resistor $R_p$ is a large resistor on the order of about 40 kilo Ohms. The passive discharge resistor $R_p$ operates at all times to give a discharge time on the order of about 5 minutes from operating voltage to less than about 60 volts. This is too slow to provide adequate discharge when a power shutdown occurs, thus necessitating the need for the active discharge resistor $R_A$.

Contactor K1 is disconnected from the battery series 220 and connected to a first end 215 of the active discharge resistor $R_A$ when a power shutdown occurs. Otherwise, contactor K1 remains connected to the battery series 220. A second end 217 of the active discharge resistor $R_A$ is continuously connected to the DC-AC converter 204 side of contactor K2. Contactors K1 and K2 are configured to disconnect the battery pack 202 from the DC-AC converter 204, and immediately start discharging the capacitance $C_X$ when contactor K1 is opened.

FIG. 3 is a schematic representation of an automatic discharge system 300 that is suitably configured to perform an automatic discharge function according to an alternative example embodiment of the invention. A practical automatic discharge system 300 may include a number of electrical components, circuits and controller units other than those shown in FIG. 3. Conventional subsystems, features, and aspects of the automatic discharge system 300 will not be described in detail herein. System 300 has a structure that is similar to system 200 (common features, functions, and elements will not be redundantly described here). For this example embodiment, as shown in FIG. 3, the automatic discharge system 300 includes: a battery pack 302, a controller 303, a DC-AC converter 304, and a hybrid motor 306.

The capacitance $C_X$ has a first pole 311 connected to contactor K1 and a second pole 313 connected to contactor K2.

The battery pack 302 may generally include: a battery series 320, a contactor K1, a contactor K2, and active discharge resistor $R_A$. Contactor K1 connects a first battery pole 322 of the battery series 320 to the DC-AC converter 304, and contactor K2 connects the second battery pole 324 of the battery series 320 to the DC-AC converter 304. Contactors K1 and K2 are configured to open in order to disconnect the battery series 320 when a power shutdown occurs. In this example embodiment, both contactors K1 and K2 are single-pole double-throw switches whereas in system 200 only K1 is single-pole double-throw and K2 was single-pole single-throw.

System 200 has the advantage that only one double-throw contactor is required which would help reduce the cost for one of the contactors. There are instances where the total cost may be reduced and the validation process simplified by using a common part for both contactors, in which case system 300 may be the preferred implementation.

As explained above in the context of FIG. 2, a first end 315 of active discharge resistor $R_A$ is connected to contactor K1 when contactor K1 is not connected to the first battery pole 322 of battery series 320. However, in contrast to the embodiment shown in FIG. 2 ($R_A$ is continuously connected to contactor K2 on the DC-AC converter 204 side of K2), a second end 317 of active discharge resistor $R_A$ is connected to contactor K2 when contactor K2 is not connected to the second battery pole 324 of battery series 320.

Contactor K1, as influenced by the controller 303, is configured to couple the input stage input node 311 to a first end 315 of the active discharge resistor (while in the shutdown mode), and is configured to couple input stage input node 311 to a first battery pole 322 of the DC power supply (while in the operating mode).

Contactor K2, as influenced by the controller 303, is configured to couple the output stage input node 313 to a second end 317 of the active discharge resistor (while in the shutdown mode), and is configured to couple input node 313 to a second battery pole 324 of the DC power supply (while in the operating mode).

Contactors K1 and K2 are configured to open in order to disconnect the battery pack 302 from the DC-AC converter 304, and immediately start discharging the capacitance $C_X$ when a power shutdown occurs. Under normal conditions, the contactors K1 and K2 are positioned such that they establish a circuit with the battery series 320. Under power shutdown conditions, the contactors K1 and K2 are positioned such that they establish a circuit with the active discharge resistor $R_A$.

Figure 4:
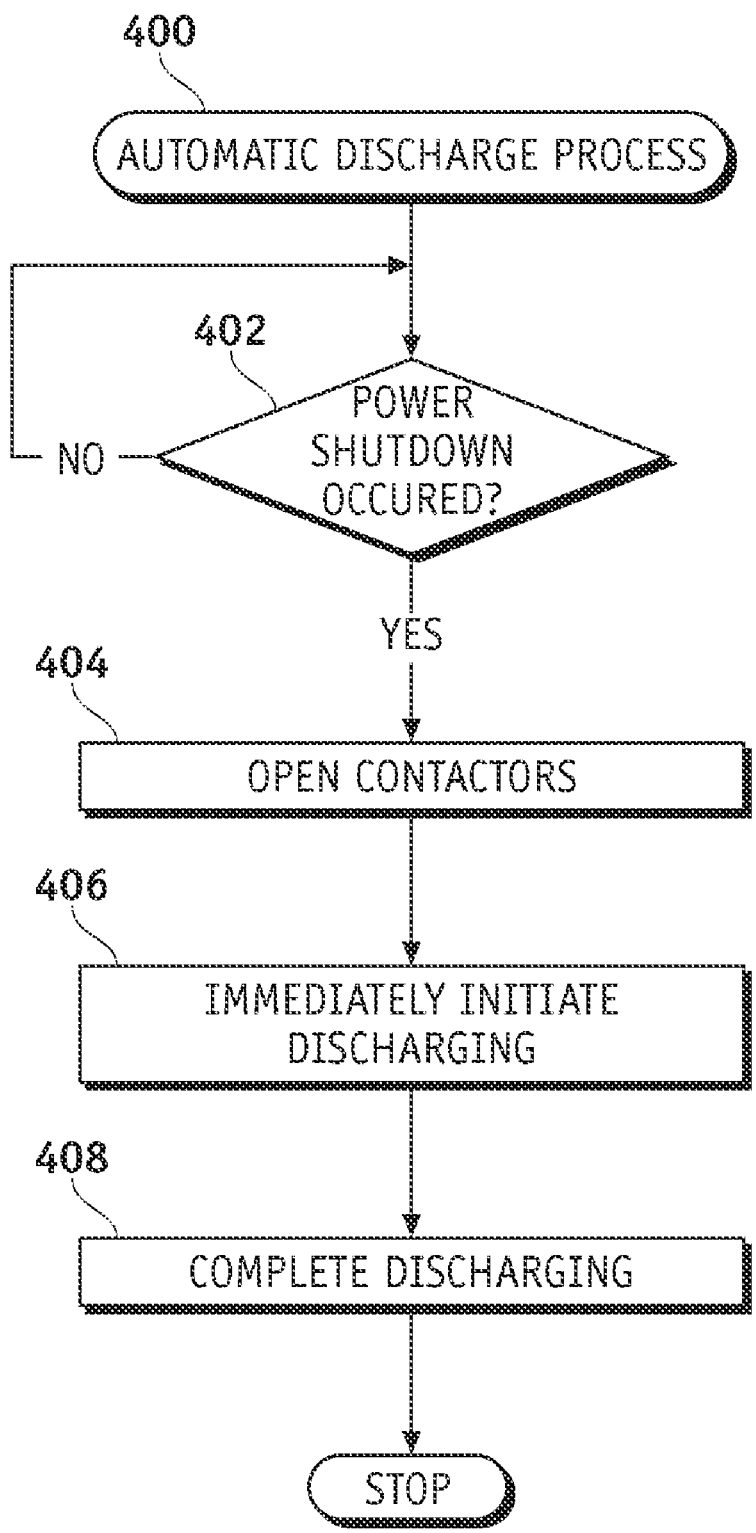
FIG. 4 is a flowchart illustrating an automatic discharge process for a hybrid vehicle according to an example embodiment of the invention.

FIG. 4 is a flowchart illustrating an automatic discharge process 500 for an electric, hybrid electric, or fuel cell vehicle that may be performed by systems 200 and 300 as described above. Process 400 checks for a power shutdown occurrence, opens the contactors, starts discharging the capacitance, and completes discharging the capacitance. The various tasks performed in connection with process 400 may be performed by software, hardware, firmware, or any combination thereof. For illustrative purposes, the following description of process 400 may refer to elements mentioned above in connection with FIGS. 2-3. In practical embodiments, portions of process 400 may be performed by different elements of automatic discharge system 200-300, e.g., the battery pack, the active discharge resistor $R_A$, the contactor K2, the contactor K1, the capacitance $C_X$, and the passive discharge resistor $R_p$.

Automatic discharge process 400 begins by checking whether a power shutdown has occurred (inquiry task 402). The check may be made by various types of devices such as, for example, without limitation, a voltage monitor, or the like, where such devices are suitably configured to monitor the vehicle, the motor, and/or the electrical system for a power shutdown condition. If no power shutdown occurs, the check may repeat until a power shutdown occurs. In this regard, process 400 leads back to inquiry task 402. However, if a power shutdown does occur, process 400 disconnects contactors K1 and K2 (task 404) from the battery pack in order to stop high voltage current flow from the battery pack to a capacitance. Task 404 may cause the contactors to open, switch states, or be reconfigured as needed for the given system implementation.

Next, process 400 will immediately initiate discharging of the capacitance $C_X$ (task 406). The discharging may be performed in the manner described above in connection with the various system embodiments. In one embodiment, the discharging is accomplished by coupling contactor K1 to the first end 215 of the active discharge resistor $R_A$ where the active discharge resistor $R_A$ has the second end 217 continuously connected to the contactor K2, for system 200. In another embodiment, the discharging is accomplished by coupling contactor K1 to the first end 315 of the active discharge resistor $R_A$ and coupling contactor K2 to the second end 317 of active discharge resistor $R_A$, for system 300. The coupling of the active discharge resistor $R_A$ in system 200-300 will cause discharging of the capacitance $C_X$ until complete discharging (task 408) is reached. The contactors K1 and K2 are controlled by a controller as explained in the context of FIGS. 2-3 above.

With the simplified automatic discharge function disclosed herein the capacitance will begin discharging significantly faster than when using software control techniques when a power shutdown occurs.

Because the simplified automatic discharge function requires no software control and no hardware sensing to initiate the discharge process, it may have a higher reliability than other implementations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An automatic discharge method for a vehicle having an electric traction motor, the method comprising:
    monitoring the electric traction motor for occurrence of a power shutdown;
    controlling a first contactor and a second contactor if the power shutdown occurs, wherein the first contactor and the second contactor are coupled between respective poles of a capacitance and a battery pack;
    initiating discharging of the capacitance using the first contactor and the second contactor, and
    completing discharging of the capacitance;
    wherein the initiating step further comprises:
    coupling the first contactor to a first end of a first active discharge resistor, wherein the first active discharge resistor has a second end continuously connected to the second contactor; and
    coupling the second contactor to a first end of a second active discharge resistor, wherein the second active discharge resistor has a second end continuously connected to the first contactor.

2. The method according to claim 1, wherein the initiating step further comprises coupling the first contactor to a first end of an active discharge resistor, wherein the active discharge resistor has a second end continuously connected to the second contactor.

3. The method according to claim 1, wherein the initiating step further comprises:
    coupling the first contactor to a first end of an active discharge resistor; and
    coupling the second contactor to a second end of the active discharge resistor.

4. The method according to claim 1, wherein the power shutdown is an electrical circuit failure.

5. The method according to claim 1, wherein the power shutdown is an electrical system shutdown.

6. The method according to claim 1, wherein the power shutdown is an electrical circuit power shutdown.

7. An automatic discharge system for a vehicle having an electric traction motor, the system comprising:
    a battery pack having a first battery pole and a second battery pole, and wherein the battery pack is configured to provide an electrical voltage and current to the electric traction motor via the first battery pole and the second battery pole;
    a power output stage;
    a capacitance having a first pole and a second pole, and coupled between the battery pack and the power output stage, wherein the capacitance is configured to control and buffer electrical energy between the battery pack and the power output stage;
    an active discharge resistor having a first end and a second end, and configured to discharge the capacitance;
    a passive discharge resistor configured to discharge the capacitance; and
    a first contactor and a second contactor, wherein the first contactor is connected to the first pole of the capacitance and the second contactor is connected to the second pole of the capacitance, wherein the first contactor and the second contactor are configured to open to start discharging the capacitance and the first contactor is further configured to switch from the first battery pole to the first end of the active discharge resistor to facilitate the discharging.

8. The system according to claim 7, wherein the second end of the active discharge resistor is connected to the second contactor.

9. The system according to claim 8, wherein a first end of a second active discharge resistor is connected to the first contactor; and the second contactor is further configured to switch from the second battery pole to the second end of the second active discharge resistor to facilitate the discharging.

10. The system according to claim 7, wherein the second contactor is further configured to switch from the second battery pole to the second end of the active discharge resistor to facilitate the discharging.

11. The system according to claim 7, wherein the electric traction motor has a plurality of modes.

12. The system according to claim 11, wherein the power output stage is configured to convert DC to AC to control how much power is sent to the electric traction motor based on one of the plurality of modes.

13. The system according to claim 11, wherein the plurality of modes comprise an acceleration mode of the electric traction motor.

14. The system according to claim 7, wherein the capacitance comprises a capacitance of an active electrical bus for the vehicle.

15. The system according to claim 7, wherein the capacitance comprises a capacitance of power electronics for the vehicle.

16. The system according to claim 7, wherein the capacitance comprises a capacitance of an ultra-capacitor for the vehicle.

17. The system according to claim 7, wherein the capacitance comprises a capacitance of the electric traction motor.

18. The system according to claim 7, wherein the capacitance comprises a capacitance of a DC-AC converter for the vehicle.

19. The system according to claim 7, wherein the capacitance comprises a capacitance of the power output stage.

20. An automatic discharge system for a vehicle having an electric traction motor, a power output stage for the electric traction motor, and a DC power supply for the power output stage, the system comprising:

a first structure corresponding to a first input node of the power output stage;

a second structure corresponding to a second input node of the power output stage, wherein the vehicle includes a capacitance across the first input node and the second input node;

a passive discharge resistor across the first input node and the second input node;

an active discharge resistor;

a contactor arrangement configured to couple the DC power supply in parallel with the capacitance while in an operating mode, and configured to couple the active discharge resistor in parallel with the capacitance while in a shutdown mode; and a controller coupled to the contactor arrangement, the controller being configured to actuate the contactor arrangement in accordance with the shutdown mode and the operating mode, wherein the active discharge resistor and the passive discharge resistor discharge the capacitance during the shutdown mode.

21. The system according to claim 20, wherein the contactor arrangement comprises:

a first contactor configured to couple the first input node to a first end of the active discharge resistor while in the shutdown mode, and configured to couple the first input node to a first pole of the DC power supply while in the operating mode; and a second contactor configured to couple the second input node to a second end of the active discharge resistor while in the shutdown mode, and configured to couple the second input node to a second pole of the DC power supply while in the operating mode.

22. The system according to claim 21, wherein:

the first contactor has a first end connected to the first input node, and a second end configured for coupling to either the first end of the active discharge resistor or the first pole of the DC power supply; and the second contactor has a first end connected to the first input node and to the second end of the active discharge resistor, and a second end configured for coupling to the second pole of the DC power supply or to remain floating.

23. The system according to claim 21, wherein:

the first contactor has a first end connected to the first input node, and a second end configured for coupling to either the first end of the active discharge resistor or the first pole of the DC power supply; and the second contactor has a first end connected to the second input node, and a second end configured for coupling to either the second end of the active discharge resistor or the second pole of the DC power supply.

\* \* \* \* \*